Patented Feb. 20, 1951

2,542,746

UNITED STATES PATENT OFFICE 2,542,746

METHOD OF PURIFYING BOROHYDRIDES OF THE ALKALI METALS

Mario D. Banus and Thomas R. P. Gibb, Jr., Marblehead, Mass., assignors to Metal Hydrides Incorporated, Beverly, Mass., a corporation of Massachusetts No Drawing. Application November 14, 1949, Serial No. 127,238

11 Claims. (Cl. 23—14)

This invention relates to the preparation of sodium borohydride and borohydrides of other alkali metals and more especially to the purification of such borohydrides.

Borohydrides of the alkali metals can be produced by reacting an alkyl borate with an alkali metal hydride. The principal products of the reaction are the borohydride of the alkali metal and the alkoxide of the alkali metal. Thus, if methyl borate is brought in contact with sodium hydride while heated to a temperature of about 245° C. to 265° C. a mixture of sodium borohydride and sodium methoxide is produced. The reaction may be illustrated by the following equation:

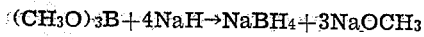

$(CH_3O)_3B + 4NaH \rightarrow NaBH_4 + 3NaOCH_3$

The sodium borohydride may be separated from the sodium methoxide by dissolving with isopropylamine or other low boiling organic solvent which is a non-solvent for the sodium methoxide. The solution of sodium borohydride is removed from the insoluble sodium methoxide by filtration and the filtrate evaporated and dried under vacuum to obtain solid sodium borohydride.

The alkali metal borohydride produced as above described is dark in color and contains a substantial amount of impurities. The purity of the product varies considerably from run to run. The removal of these impurities has presented a very difficult problem. The present invention contemplates the removal of substantial amounts of these impurities.

We have discovered that some of these impurities have been introduced due to the presence of acetone in the isopropylamine. Industrial isopropylamine free of acetone can be obtained but if acetone is present it can be condensed by permitting the impure isopropylamine to stand at ordinary temperature in contact with sodium hydride or metallic sodium, preferably in the form of a fine wire or sand, for several hours. The isopropylamine can then be distilled and removed from the condensation product.

Even when the sodium borohydride is separated from the sodium methoxide using isopropylamine free of acetone, impurities still remain in the solution of sodium borohydride and the final product obtained. We have discovered further that a considerable amount of these remaining impurities can be converted to solids which are insoluble in isopropylamine. Thus, we have discovered that if a small amount of water is added to the isopropylamine used to dissolve the sodium borohydride the water reacts with the dissolved impurities to form a solid and an alkyl alcohol. The solid compound thus formed is insoluble in the solution and remains with the insoluble alkoxide. The alkyl alcohol can be removed from the sodium borohydride together with the isopropylamine by evaporation at low temperature under vacuum. If a large excess of water is used a dihydrate of sodium borohydride is formed during evaporation and is extremely difficult to remove. Also if too large an excess of water is used the desired precipitate may redissolve or the water may react with the sodium borohydride or both. We have found that an effective amount of water for this purpose is an amount within the range from about 25 to about 110 per cent by weight, preferably about 50 per cent, based upon the weight of the total impurities in the product to be purified. A smaller amount may be used but does not remove as large a proportion of the impurities. If a larger amount is used the dihydrate of the borohydride is formed during evaporation and is difficult to remove. The reaction takes place slowly and the reaction mixture should be permitted to stand, preferably with agitation, until the reaction is complete. The temperature used may be room temperature.

The alkyl alcohol formed by the reaction of water with the dissolved impurities as above described or the excess of water used or both can be removed from the borohydride solution by adding thereto, preferably with agitation, a substance which is insoluble in the solvent for the borohydride and does not react with the borohydride and which reacts rapidly with or absorbs water or the alkyl alcohol or both forming a product which is insoluble in the solvent and does not react with the borohydride. Illustrative substances of the above type which react with or absorb water are calcium hydride, barium oxide, calcium sulfate $(CaSO_4 \cdot \tfrac{1}{2}H_2O)$, activated alumina, silica gel, etc. Illustrative substances of the above type which react with or absorb both water and the lower alkyl alcohols, such as methyl, ethyl and isopropyl alcohol, are metallic sodium, sodium hydride, etc. Other substances of these types will be readily apparent to those skilled in the art.

We have also discovered that if water, in the form of an aqueous solution of sodium hydroxide, is added to the borohydride solution, preferably with agitation, the sodium hydroxide solution performs the same function as water alone although it is not as effective as water alone. The concentration of the sodium hydroxide solution used may be from about a 5 per cent solution to a saturated solution. In place of sodium hydroxide, the hydroxide of another alkali metal, such as potassium, may be used. By permitting the mixture to stand the alkali metal hydroxide solution separates as an immiscible layer containing the precipitated solids and which can be easily separated from the isopropylamine solution of the borohydride. If solid alkali metal hydroxide or a nearly saturated aqueous solution of the hydroxide is added to the borohydride solution after the impurities in the latter have been reacted with water alone, the alkali metal hydroxide functions to absorb the excess water used.

To assist in the removal of any excess water, a low boiling inert liquid may be added to the borohydride solution. Such liquid should be immiscible with water and non-reactive with either the borohydride or the solvent therefor. Thus, such a liquid may be added to the borohydride solution until substantial quantities of the borohydride start to precipitate from the solution and then the solution is evaporated to remove the borohydride solvent. During evaporation the inert liquid is removed and tends to remove water with it. Illustrative examples of suitable inert liquids are carbon tetrachloride, normal propyl chloride, benzene, isopentane, isohexane, normal hexane, etc.

The solution of the impure sodium borohydride in isopropylamine free of acetone has a brown color. Some of this coloring matter is removed with the precipitate formed by the reaction of water with the dissolved impurities. We have discovered, however, that coloring matter together with a considerable amount of other impurities can be removed by incorporating activated charcoal with dry isopropylamine used as a solvent for the sodium borohydride, the coloring matter remaining with the residue obtained by filtration. Thus, when color is important and a white sodium borohydride product is desired, from 1 to about 10 per cent of activated charcoal or carbon based upon the weight of the impure borohydride can be added to the impure product and the product then may be subjected to the action of dry isopropylamine and the solution filtered. A small amount of water then may be added to react with the impurities and the solution again filtered. If desired the water may be added with the activated carbon. The amount of impurities removed by activated carbon is substantially greater than that which can be attributed to coloring matter alone.

In place of isopropylamine other solvents which are stable in the presence of water may be used, such as morpholine, pyridine, and other stable primary amines containing not more than six carbon atoms per amino group and having a boiling point of less than about 120° C. Illustrative examples of such other primary amines are methyl, ethyl and propyl amines, isobutyl amine, cyclohexyl amine, ethylene di amine, etc.

While our investigations have been confined to the purification of sodium borohydride produced by reacting methyl borate with sodium hydride, it is apparent that the invention is equally applicable to the purification of sodium borohydride produced by reacting sodium hydride with other alkyl borates, such as ethyl, propyl, isopropyl, butyl, isobutyl, borate, etc. Also, it is believed the invention is applicable to the purification of sodium borohydride produced by other methods, such as that described in the patents to Hermann I. Schlesinger and Herbert C. Brown, No. 2,461,661, No. 2,461,662 and No. 2,461,663, dated February 15, 1949.

In the following specific examples, the sodium borohydride used was prepared by reacting methyl borate with sodium hydride as previously described using isopropylamine to dissolve the sodium borohydride and remove it from the insoluble sodium methoxide.

Example 1

One liter of isopropylamine containing about 5 per cent acetone was placed in a flask and 5 grams of sodium metal in the form of a fine wire was added. After standing at room temperature for about 24 hours, the isopropylamine was distilled off and was free of acetone.

Example 2

An impure sodium borohydride having a brown color and containing 85 per cent sodium borohydride was dissolved in a flask with 100 grams of dry isopropylamine free of acetone, giving a brown solution. About 3 grams of activated charcoal was added to the solution accompanied by slight bubbling. After standing at room temperature about 2 hours, the solution was filtered and a nearly colorless filtrate was obtained. The filtrate was evaporated to near dryness at 40 to 50° C. and then dried at 150° C. under a pressure of 1 mm. of mercury to obtain a white fluffy powder containing 92 per cent sodium borohydride.

Example 3

0.9 gram of water was added to 200 milliliters of isopropylamine free of acetone and placed in a flask. To this 10 grams of sodium borohydride of 75 per cent purity was added and the mixture agitated for one half hour. The reaction product then was filtered and the filtrate evaporated to near dryness at 40 to 50° C. and then dried under vacuum at about 100° C. The dried product contained 85 per cent sodium borohydride. Similar results are obtained by evaporating the filtrate under vacuum at a low temperature, such as 10° C., until the solvent is essentially removed and then gradually raising the temperature to 100° C. The amount of water added in this example was about 36 per cent of the weight of the impurities in the original sodium borohydride.

Example 4

63 grams of sodium borohydride of 75 per cent purity was added to 1700 milliliters of isopropylamine free of acetone and containing 24 grams water. The mixture was stirred vigorously for one hour and then filtered. The filtrate was evaporated at atmospheric pressure until the solvent was substantially removed and the residue was dried for two hours at a temperature between 80° C. and 90° C. under a pressure of about 5 mm. of mercury. The resulting solid weighed 49.4 grams and contained 87 per cent sodium borohydride. The solid was then redried for 2 hours at a temperature of 120° C. under a pressure of 1 mm. of mercury. The solid product then weighed 42.8 grams and contained 94.8 per cent sodium borohydride. The second drying operation removed 6.6 grams water which apparently was present as dihydrate of sodium borohydride. The amount of water added in this example was about 150 per cent of the weight of the impurities in the original sodium borohydride.

Example 5

35 grams of sodium borohydride of 80 per cent purity was added to 900 milliliters of isopropylamine free of acetone in a reaction vessel. To this was added 25 milliliters of a 35 per cent aqueous solution of sodium hydroxide. The mixture was stirred ½ hour. The insoluble solids collected in the aqueous layer of sodium hydroxide solution at the bottom of the vessel. The isopropylamine solution was separated in a separatory funnel, filtered and evaporated at atmospheric pressure followed by drying for 2 hours at 80–90° C. at about 5 mm. pressure. The product weighed 24.8 grams and contained 89.2 per cent sodium borohydride.

Example 6

31 grams of sodium borohydride of 80 per cent purity was dissolved in a reaction vessel with 900 milliliters of isopropylamine free of acetone and 6 grams of water was added. The mixture was stirred for 30 minutes and then filtered and evaporated and dried as described in Example 5. The product weighed 21 grams and contained 94.7 per cent sodium borohydride. There was no evidence of any sodium borohydride hydrate formation.

We claim:

1. In a method of preparing sodium borohydride which comprises reacting an alkyl borate with sodium hydride to obtain a reaction product comprising sodium borohydride and sodium alkoxide, dissolving the sodium borohydride with a solvent therefor which is stable in the presence of water and which is a non-solvent for the sodium alkoxide, and separating the solution from the insoluble material, the improvement which comprises introducing into the solution of the borohydride an amount of water effective to react with a portion of the impurities in the borohydride and form a compound insoluble in the solution.

2. In a method as described by claim 1 in which the water is introduced in the form of an aqueous solution of an alkali metal hydroxide.

3. In a method as described by claim 1 the step consisting of introducing into said solution a substance which is insoluble in said solution and non-reactive with the borohydride and is capable of forming with a material selected from the group consisting of a lower alkyl alcohol and water, a product which is insoluble in said solution and is non-reactive with the borohydride.

4. In a method as described by claim 1 in which an alkali metal hydroxide is added to the solution to absorb excess water after said impurities have been reacted with water.

5. In a method as described by claim 1 in which a low boiling liquid which is immiscible with water and is inert toward the borohydride and the solvent therefor is added to the borohydride solution to assist in the removal of excess water by subsequent evaporation.

6. In a method as described by claim 1 in which the solvent is selected from the group consisting of morpholine, pyridine and stable primary amines containing not more than six carbon atoms per amino group and having a boiling point not greater than about 120° C.

7. In a method as described by claim 1 in which the solvent is isopropylamine free of acetone.

8. In a method as described by claim 7 in which the water is introduced in the form of an aqueous solution of an alkali metal hydroxide.

9. In a method as described by claim 7 in which the alkyl borate is methyl borate.

10. In a method as described by claim 7 in which an alkali metal hydroxide is added to the solution to absorb excess water after said impurities have been reacted with water.

11. In a method for preparing sodium borohydride wherein a reaction product is obtained comprising essentially sodium borohydride and sodium alkoxide and including an impurity of the reaction of sodium hydride with an alkyl borate which is soluble in liquids which are solvents for sodium borohydride and non-solvents for sodium alkoxide, the step which comprises dissolving the sodium borohydride with a solvent therefor which is stable in the presence of water and which is a non-solvent for the sodium alkoxide, said solvent containing an amount of water effective to react with a portion of said impurity and form a compound insoluble in the solution formed.

MARIO D. BANUS.
THOMAS R. P. GIBB, Jr.

No references cited.